US011533611B2

United States Patent
Berard et al.

(10) Patent No.: US 11,533,611 B2
(45) Date of Patent: Dec. 20, 2022

(54) METHOD FOR REMOTE SUBSCRIPTION MANAGEMENT OF AN EUICC, CORRESPONDING TERMINAL

(71) Applicant: THALES DIS FRANCE SAS, Meudon (FR)

(72) Inventors: Xavier Berard, Gemenos (FR); Benjamin Mazet, Gemenos (FR)

(73) Assignee: THALES DIS FRANCE SAS, Meudon (FR)

( * ) Notice: Subject to any disclaimer, the term of this patent is extended or adjusted under 35 U.S.C. 154(b) by 0 days.

(21) Appl. No.: 15/549,250

(22) PCT Filed: Feb. 5, 2016

(86) PCT No.: PCT/EP2016/052478
§ 371 (c)(1),
(2) Date: Aug. 7, 2017

(87) PCT Pub. No.: WO2016/128311
PCT Pub. Date: Aug. 18, 2016

(65) Prior Publication Data
US 2018/0027410 A1    Jan. 25, 2018

(30) Foreign Application Priority Data
Feb. 13, 2015    (EP) .................... 15305216

(51) Int. Cl.
*H04W 12/04*    (2021.01)
*H04W 4/70*    (2018.01)
(Continued)

(52) U.S. Cl.
CPC .......... *H04W 12/04* (2013.01); *G06F 21/602* (2013.01); *H04L 9/3263* (2013.01); *H04W 4/50* (2018.02);
(Continued)

(58) Field of Classification Search
CPC ... H04W 12/04; H04W 12/0401; H04W 4/50; H04W 12/002; H04W 12/0023;
(Continued)

(56) References Cited

U.S. PATENT DOCUMENTS

2012/0173743 A1    7/2012 Yu
2013/0012168 A1    1/2013 Rajadurai et al.
(Continued)

FOREIGN PATENT DOCUMENTS

KR    20130026958 A    3/2013
WO    WO 2011/115407 A2    9/2011

OTHER PUBLICATIONS

Park, J. et al., Secure Profile Provisioning Architecture for Embedded UICC, 2013 International Conference on Availability, Reliability and Security, pp. 297-303. (Year: 2013).*
(Continued)

*Primary Examiner* — Daniel B Potratz
*Assistant Examiner* — D'arcy Winston Straub
(74) *Attorney, Agent, or Firm* — Adam Lewental; Thales DIS CPL USA, Inc

(57) ABSTRACT

Remote subscription management of an eUICC comprising a private key and a public certificate, the public certificate comprising information allowing a subscription manager server to decide if it can agree to manage the eUICC. The method includes: establishing a secure channel between the terminal and the subscription manager server by using the public certificate and dedicated cryptographic services of the eUICC; sending to the subscription manager server a subscription management request; verifying, based on the information in the public certificate in the subscription manager server, whether the eUICC is entitled to be managed by the subscription manager server and, if yes: performing a key establishment procedure between the subscription manager
(Continued)

server and the eUICC by using the eUICC public certificate; establishing between the subscription manager server and the eUICC a secure channel with the established keys; and, executing by the subscription manager server the subscription management request on the eUICC.

9 Claims, 2 Drawing Sheets

(51) Int. Cl.
```
     H04W 4/50      (2018.01)
     H04W 12/30     (2021.01)
     H04W 12/069    (2021.01)
     G06F 21/60     (2013.01)
     H04L 9/32      (2006.01)
     H04W 12/06     (2021.01)
     H04W 12/42     (2021.01)
     H04W 76/10     (2018.01)
     H04W 4/80      (2018.01)
```
(52) U.S. Cl.
CPC ............ *H04W 4/70* (2018.02); *H04W 12/06* (2013.01); *H04W 12/069* (2021.01); *H04W 12/35* (2021.01); *H04W 12/42* (2021.01); *H04W 76/10* (2018.02); *H04L 2209/80* (2013.01); *H04W 4/80* (2018.02)

(58) Field of Classification Search
CPC ......... H04W 4/70; H04W 4/80; H04W 12/06; H04W 12/069; H04W 12/35; H04W 12/42; H04W 76/10; G06F 21/602; H04L 9/3263; H04L 2209/80
See application file for complete search history.

(56) References Cited

U.S. PATENT DOCUMENTS

| | | | | |
|---|---|---|---|---|
| 2014/0004827 | A1 | 1/2014 | O'Leary | |
| 2014/0011541 | A1* | 1/2014 | Cormier | H04L 9/3268 455/558 |
| 2014/0140507 | A1 | 5/2014 | Park et al. | |
| 2014/0287725 | A1* | 9/2014 | Lee | H04W 12/35 455/411 |
| 2014/0329502 | A1* | 11/2014 | Lee | H04W 12/04 455/411 |
| 2015/0163056 | A1* | 6/2015 | Nix | H04W 12/06 380/46 |

OTHER PUBLICATIONS

Park, J. et al., Secure Profile Provisioning Architecture for Embedded UICC, 2013, 2013 Int'l Conf. on Availability, Reliability, and Security, pp. 297-303. (Year: 2013).*

International Search Report (PCT/ISA/210) dated Apr. 8, 2016, by the European Patent Office as the International Searching Authority for International Application No. PCT/EP2016/052478.

Written Opinion (PCT/ISA/237) dated Apr. 8, 2016, by the European Patent Office as the International Searching Authority for International Application No. PCT/EP2016/052478.

Gsma: "Official Document 12FAST.13—Embedded SIM Remote Provisioning Architecture, Version 1.1", Dec. 2013, XP055135431, 84 pages, URL: http://www.gsma.com/connectedliving/wp-content/uploads/2014/01/1.-GSMA-Embedded-SIM-Remote-Provisioning-Architecture-Version-1.1.pdf.

Park et al., "Secure Profile Provisioning Architecture for Embedded UICC", International Conference on Availability, Reliability and Security, IEEE, Sep. 2013, pp. 297-303.

"Smart Cards; Embedded UICC; Technical Specification (Release 13); ETSI TS 103 384", European Telecommunications Standards Institute (ETSI), Jan. 2015, pp. 1-19.

"oneM2M Security Solutions", 3GPP2 Draft, TS-0003-Security Solutions-V-2014-08, 3rd Generation Partnership Project 2, vol. TSGAC, Aug. 1, 2014, pp. 1-91, URL:http://ftp.3gpp2.org/TSGAC/Incoming/WG2-Signaling-Protocol-FileShare/20141202SWG2/.

Office Action (Notice of Decision to Grant a Patent) dated Nov. 6, 2018, by the Japan Patent Office in corresponding Japanese Patent Application No. 2017-541945. (3 pages).

Park et al., "Secure Profile Provisioning Architecture for Embedded UICC", https://www.researchgate.net/publication/258312087, ResearchGate, Conference Paper, Sep. 2013, (10 pages).

Office Action/Examination Search Report dated Aug. 12, 2021, by the Canadian Patent Office in corresponding Canadian Patent Application No. 2,975,540. (6 pages).

* cited by examiner

METHOD FOR REMOTE SUBSCRIPTION MANAGEMENT OF AN EUICC, CORRESPONDING TERMINAL

BACKGROUND

The present invention concerns telecommunications and more precisely remote subscription management of eUICCs (a eUICC is a Universal Integrated Circuit Card which is not easily accessible or replaceable, is not intended to be removed or replaced in the device with which it cooperates, like for example defined in the GSMA Technical Specification, version 2.0, Oct. 13, 2014 and entitled "Remote Provisioning Architecture for Embedded UICC"). The device can be a M2M apparatus (Machine to Machine), a smartphone, a tablet, a PDA, generally speaking a telecommunication terminal.

This Specification defines a technical solution for the remote provisioning and management of eUICCs. The adoption of this technical solution aims to provide the basis for ensuring global interoperability between potentially different MNO (Mobile Network Operator) deployment scenarios, different makers of network elements (e.g. SM-DP, SM-SR) and different providers of eUICC elements. SM-DP stands for Subscriber Manager Data Preparation and SM-SR for Subscriber Manager Secure Routing.

FIG. 1 shows a global system for remote provisioning of secure elements.

The secure elements are here eUICCs. Only one eUICC 10 is represented. The eUICC 10 has been manufactured by a EUM (eUICC Manufacturer) 11 and cooperates with a telecommunication terminal not represented. A subscription can be downloaded over the air in the eUICC 10 through a third party owning a SM-DP 12, typically a MNO, and another party (or the same party) owning a SM-SR 13.

The SM-DP 12 is in charge to generate the subscription scripts and to ensure the download and installation of this script in the eUICC 10 through the SM-SR.

The SM-SR 13 ensures a transport layer and has the responsibility to perform content management actions on the eUICC 10, on behalf of the SM-DP 12.

The SM-DP 12 can receive from the EUM 11 some data (executable or not), permitting to provide the eUICC 10 with a full subscription. In addition, the SM-DP 12 completes EUM data with operator's data, applications, keys, the couple IMSI/Ki, a file system, . . . according to MNO's specifications.

The present invention concerns a method for managing a eUICC by a subscription manager server (e.g. SM-DP in the GSMA context) with an online method allowing further remote subscription management by the subscription manager server.

This method simplifies the deployment of the eco-system for the consumer market (tablets, pda, mobile phone . . . ) by getting useless any pre-provisioning step of shared key or any other material.

In the state of the art, the SM-SR for the M2M market has to be provisioned with eUICC data. The eUICC manufacturer EUM has also to produce eUICCs with constraints related to provisioning the SM-DP. More precisely, in the context of the remote subscription management, one of the main difficulties is during the set-up of the eco-system when the subscription manager server must be provisioned with data of all eUICCs to be managed (identifiers, credentials, . . . ). The problems are the following:

It is not the same actors that will manage the manufacturing of the eUICCs and operation of the subscription manager server: The EUM has to be aware of which subscription manager server could have to manage their eUICCs.

In case a new subscription manager server appears, how it can retrieve the data of any of the already deployed eUICCs that it may have to manage?

This necessity of provisioning comes mostly from the constraint of M2M market where most of the uses cases are initiated by the server part, in push mode (download of initial connectivity, swap, delete) as no end-user is there to trigger the operations that have to be executed on the eUICCs.

The present invention proposes a method for the subscription manager server to manage eUICCs embedded in terminals for the Consumer market. Such a management typically comprises download a subscription on the eUICC, switch from one subscription to another one or delete a subscription on a eUICC.

This invention applies in the consumer market where the eUICC is embedded in a terminal and there is no "push" of data realized by the manager server (SM-DP in the context of the GSMA).

The SM-SR of the state of the art is typically managed by a service provider (company managing M2M devices, like for example electricity meters, cars (car manufacturer), telecommunication terminals like smartphones or tablets) and the management of the eUICCs is realized in a push mode: The service provider decides which eUICCs have to be managed and when.

In the Consumer Market it is more likely that the end-user will choose the MNO that will provide the connectivity service for its consumer device and that will administrate his eUICC. The end-user scrolls in a menu showing the available MNOs and selects a subscription from one of these MNOs. The selected subscription is then downloaded via OTA (Over The Air) in his eUICC.

SUMMARY

The present invention proposes a solution where there is no more need to pre-provision eUICC credential and information, where there is no more need to use a SM-SR to install a subscription in a eUICC, where the end-user can choose the MNO who will manage his eUICC, and where the eUICCs can be manufactured by different EUMs.

This solution consists in a method for remote subscription management of an eUICC cooperating with a terminal, the eUICC comprising a private key and a public certificate signed by its manufacturer, the public certificate also comprising an information allowing a subscription manager server, with no prior knowledge of the eUICC, to decide if it can agree to manage the eUICC, the method comprising:

a—At the occurrence of an event, establishing a secure channel between the terminal and the subscription manager server by using the public certificate and dedicated cryptographic services of the eUICC;

b—Sending from the terminal to the subscription manager server a subscription management request, being considered as an enrolment request by the subscription manager server;

c—Verifying, thanks to the information comprised in the received public certificate from the eUICC, in the subscription manager server if the eUICC is entitled to be managed by the subscription manager server and, if yes:

d—Performing a key establishment procedure between the subscription manager server and the eUICC by using the eUICC public certificate, this step being the enrolment of the eUICC by the SM-DP;

e—Establishing between the subscription manager server and the eUICC a secure channel with the keys generated at step—d—;

f—Executing by the subscription manager server the subscription management request on the eUICC.

Preferably, the terminal comprises an application, the application performing steps—a—and—b—by:

at the occurrence of the event, establishing a local secure channel between the eUICC and the application by using the private key and the public certificate;

establishing a secure channel with the subscription manager server by using the public certificate and dedicated cryptographic services of the eUICC;

sending from the application to the subscription manager server a subscription management request of the eUICC.

Alternatively, it is the eUICC that performs the steps—a—and—b—.

In a preferred implementation, the event is generated by a user of the terminal.

The invention also concerns a terminal comprising a eUICC and an application, the eUICC comprising a private key and a public certificate, wherein the application comprises instructions that cause a computer to execute the following operations:

at the occurrence of an event, establishing a local secure channel between the eUICC and the application by using the private key and the public certificate, the public certificate also comprising an information allowing a subscription manager server, with no prior knowledge of the eUICC, to decide if it can agree to manage the eUICC;

establishing a secure channel with the subscription manager server by using the public certificate and dedicated cryptographic services of the eUICC;

sending from the application to the subscription manager server a subscription management request of the eUICC.

The invention also concerns a terminal comprising a eUICC, the eUICC comprising a private key and a public certificate, the public certificate also comprising an information allowing a subscription manager server, with no prior knowledge of the eUICC, to decide if it can agree to manage the eUICC, wherein the eUICC comprises instructions that cause a computer to execute the following operations:

at the occurrence of an event, establishing a secure channel between the eUICC and a subscription manager server by using the public certificate and dedicated cryptographic services of the eUICC;

sending from the eUICC to the subscription manager server a subscription management request of the eUICC.

The invention also concerns a non-transitory computer readable storage medium comprised in a terminal, the terminal also comprising a eUICC comprising a private key and a public certificate, the public certificate also comprising an information allowing a subscription manager server, with no prior knowledge of the eUICC, to decide if it can agree to manage the eUICC, the non-transitory computer-readable medium comprising instructions that cause a computer to execute the following operations:

at the occurrence of an event, establishing a secure channel between the terminal and the subscription manager server by using the private key and the public certificate;

sending from the terminal to the subscription manager server a subscription management request of the eUICC.

The non-transitory computer readable storage medium is preferably comprised in the eUICC.

The following description of an implementation example of the present invention will be done in regard of FIGS. 2 and 3.

DETAILED DESCRIPTION

Figure 2:
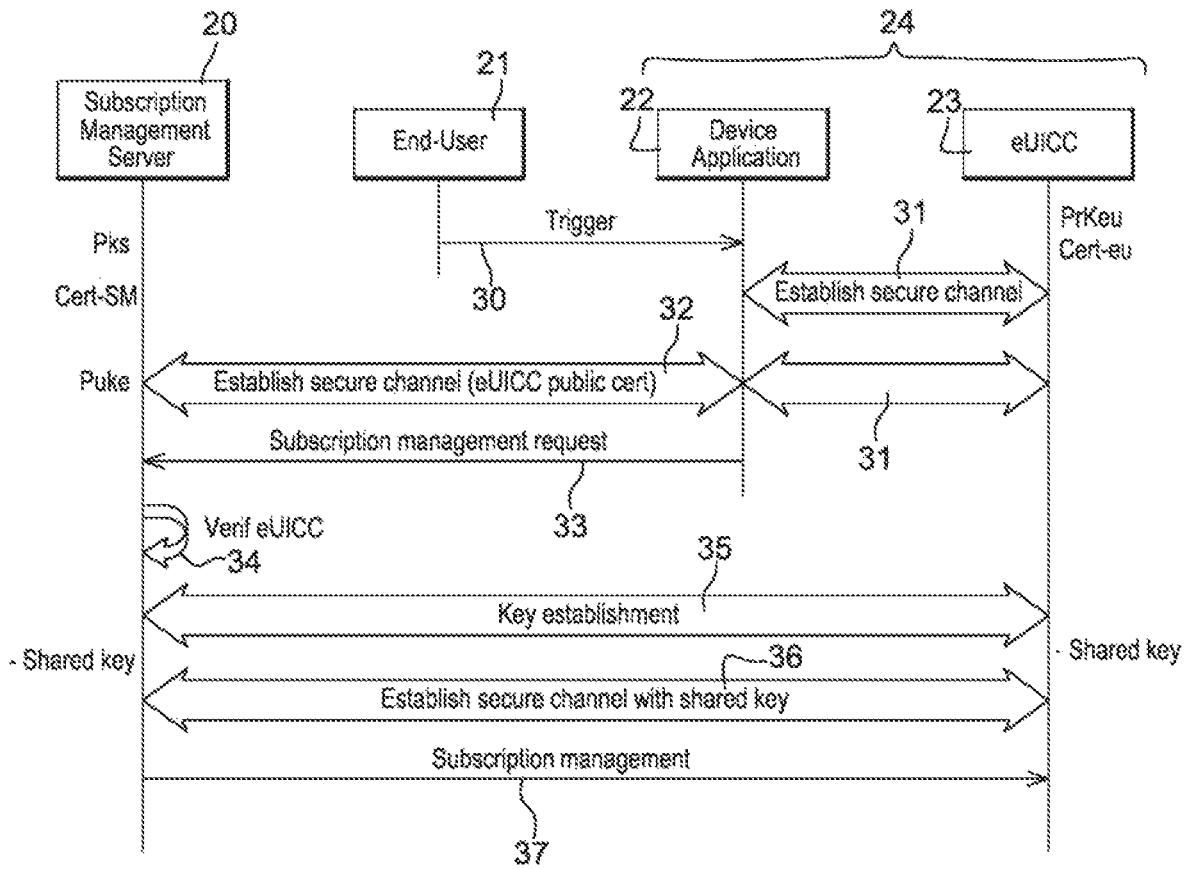
FIG. 2 is a timing diagram illustrating steps of a method of remote subscription management according to a first embodiment of the invention.

In FIG. 2, four entities are represented: A subscription manager server 20, an end user 21, a device application 22 and a eUICC 23.

Figure 1:
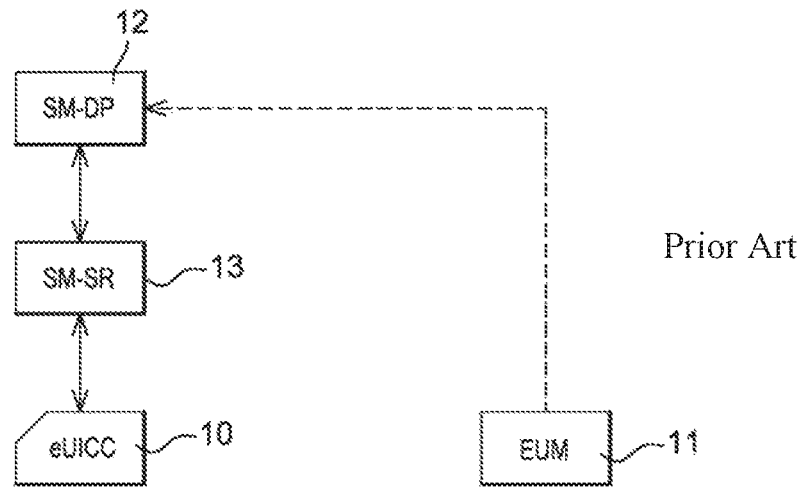
FIG. 1 is a block diagram of a global system for remote provisioning of secure elements.

When GSMA standard is implemented, the subscription manager server 20 corresponds to a SM-DP (like referenced 12 in FIG. 1). Here an end user 21 is present for triggering at least the initial step of the invention. However, as it will be explained, the presence of an end-user is not mandatory. The device application 22 (or "terminal application" as it will be seen later, this application can also be located in the eUICC 23) and the eUICC 23 are comprised in a terminal 24. The device application 22 can be installed in the terminal or in the eUICC 23.

The eUICCs to be managed are manufactured independently by the eUICC manufacturers with a simple private key PrKeu and a public certificate Cert-eu (containing the public key PuKeu of the eUICC 23), certificate being signed by their eUICC manufacturers.

The subscription manager server 20 has no knowledge of the individual eUICCs, but has simply some knowledge about the eUICC manufacturer (public key Puke of each eUICC manufacturer that is trustable, so for which the subscription manager server 20 is allowed to manage eUICCs). This is a white list process: The subscription manager server 20 can be coded to reject eUICCs for which the eUICC manufacturer is not trusted.

Preferably, the public certificate Cert-eu also comprises an information allowing the subscription manager server 20, with no prior knowledge of the eUICC 23, to decide if it can agree to manage the eUICC 23. This information is for example the operating system of the eUICC, its version or another technical information related to the eUICC.

The steps represented in FIG. 2 are the following:

The first step is here an event 30 by which the end user 21 triggers a request of management of the eUICC 23 comprised in the terminal 24. This can consist in selecting in a menu (thanks to a man/machine interface) the action to be performed by the subscription manager server 20 on the eUICC 23. The event 30 can also be automatic: A first switched on of the terminal 24 can generate the trigger. It is also possible to launch the process by scanning a QR code by the terminal or by reading a NFC tag, the important point being that it is not at the initiative of the subscription manager server 20.

After this event, a local secure channel 31 is established between the eUICC 23 and the application 22 by using the private key Prkeu and the public certificate Cert-eu. This is done in the following manner for example:

The application 22 requests from the eUICC 23 its public key, comprised in the certificate Cert-eu;

The eUICC 23 sends this public key to the application 22 and the application 22 is then able to encrypt a secret with this public key. The secret can be considered as a session key;

The eUICC decrypts the encrypted secret with its private key Prkeu and is then able to encrypt messages with this secret.

The eUICC 23 is not able to authenticate the application 22 because the application does not hold a certificate.

However, the application 22 is able to establish a secure channel 32 (for example a TLS channel) with the subscription manager server 20 by using the public certificate Cert-eu and dedicated cryptographic services of the eUICC 23:

The public key of the eUICC is sent by the application 22 to the subscription manager server 20 that encrypts a secret with this public key of the eUICC 23 and returns the encrypted secret along with its public key (contained in its public certificate Cert-SM) to the application 22. The application 22 acts as a proxy and transmits the received data to the eUICC 23;

The eUICC 23 decrypts the encrypted secret with its private key Prkeu for obtaining the secret;

The eUICC 23 encrypts the secret with the public key of the subscription manager server 20 and sends the encrypted secret to the subscription manager server 20 through the application 22;

The subscription manager server 20 decrypts the encrypted secret with its private key Pks and verifies if the decrypted secret is the same than the one it has generated previously. If the result is positive, the subscription manager server 20 can derive a session key from the secret that can be used later (step 35) for communicating directly with the eUICC 23.

The description of steps 31 to 32 is given as a simple example of key establishment procedure between the eUICC and the Subscription Management Server. Any other key establishment procedure using the credentials of the eUICC and the Subscription Management Server described in this invention may also be used.

Advantageously the eUICC may also authenticate the Subscription Management Server if instead of sending only its public key, the Subscription Management Server would send its certificate signed by a trustable third party entity for which the eUICC would have its public key.

The next step (33) consists in sending from the application 22 to the subscription manager server 20 a subscription management request of the eUICC 23.

This request comprises the public certificate Cert-eu of the eUICC 23. As already explained, the public certificate Cert-eu also comprises an information allowing the subscription manager server 20, to decide, at step 34, if it can agree to manage the eUICC 23.

If the subscription manager server 20 considers that it can manage the eUICC 23 (it is a trustable eUICC manufacturer and it is a eUICC model that I support), the subscription manager server 20 performs, at step 35, a key establishment procedure with the eUICC 23 by using the eUICC public certificate Cert-eu. This steps corresponds to the enrolment of the eUICC by the SM-DP.

This permits to generate session keys (private keys) at the level of the subscription manager server 20 and at the level of the eUICC 23 (e.g ISD-P). This is for example done according to the key establishment procedure as defined in the GlobalPlatform Scenario #3 based on Diffie-Hellman approach that provides the "perfect forward secrecy" characteristics to the generated keys.

At step 36, a secure channel is established between these two entities with the keys generated at step 35.

At step 37, the subscription manager server 20 can then manage the eUICC, for example downloading a complete subscription.

The aforementioned dedicated cryptographic services of the eUICC 23 are cryptographic functions allowing the eUICC 23 to encrypt and decrypt messages exchanged with the application 22 and the subscription manager server 20.

In the solution described in FIG. 2, the terminal 24 has a eUICC 23 and a dedicated device application 22 on the terminal 24 (or in the eUICC 23) to manage the local user interface and the connection between the eUICC 23 and the subscription manager server 20. But the invention also applies on a terminal comprising only the eUICC 23, the eUICC 23 being directly connected to the subscription manager server 20.

This solution will now be described in regard to FIG. 3.

In this figure, there is no more an application in the terminal containing the eUICC 23.

The trigger of the eUICC management is here also at the initiative of the end-user 21 (step 40). Steps 31 and 32 of FIG. 2 are here entirely managed by the eUICC 23 that receives the management request from the end-user 21. As described in regard to FIG. 2, this trigger can also be generated without the end user 21.

The eUICC 23 establishes an end-to-end secure channel 41 with the subscription manager server 20 by using its public certificate Cert-eu and its dedicated cryptographic services.

Once this secure channel 41 has been established, the eUICC sends a subscription management request 42 to the subscription manager server 20.

Steps 43, 44, 45 and 46 correspond respectively to steps 34, 35, 36 and 37 of FIG. 2.

Thus, in these two examples, the invention proposes a method for remote subscription management of an eUICC 23 cooperating with a terminal 24, the eUICC 23 comprising a private key Prkeu and a public certificate Cert-eu signed by its manufacturer, the public certificate Cert-eu also comprising an information allowing a subscription manager server 20, with no prior knowledge of the eUICC 23, to decide if it can agree to manage the eUICC 23, the method comprising:

a—At the occurrence of an event 30 or 40, establishing a secure channel 32 or 41 between the terminal 24 and the subscription manager server 20 by using the public certificate Cert-eu and dedicated cryptographic services of the eUICC 23;

b—Sending (33 or 42) from the terminal 24 to the subscription manager server 20 a subscription management request;

c—Verifying (34 or 43), thanks to the information comprised in the received public certificate from the eUICC 23, in the subscription manager server 20 if the eUICC 23 is entitled to be managed by the subscription manager server 20 and, if yes:

d—Performing (35 or 44) a key establishment procedure between the subscription manager server 20 and the eUICC 23 by using the eUICC 23 public certificate, corresponding to the enrolment of the eUICC by the SM-DP;

e—Establishing (36 or 45) between the subscription manager server 20 and the eUICC 23 a secure channel with the keys generated at step—d—;

f—Executing (37 or 46) by the subscription manager server 20 the subscription management request on the eUICC 23.

In regard to FIG. 2, the invention also concerns a terminal 24 comprising a eUICC 23 and an application 22, the eUICC 23 comprising a private key Prkeu and a public certificate Cert-eu, wherein the application 22 comprises instructions that cause a computer to execute the following operations:

at the occurrence of an event, establishing a local secure channel between the eUICC 23 and the application 22 by using the private key Prkeu and the public certificate Cert-eu, the public certificate Cert-eu also comprising an information allowing a subscription manager server 20, with no prior knowledge of the eUICC 23, to decide if it can agree to manage the eUICC 23;

establishing a secure channel with the subscription manager server 20 by using the public certificate Cert-eu and dedicated cryptographic services of the eUICC 23;

sending from the application 22 to the subscription manager server 20 a subscription management request of the eUICC 23.

Figure 3:
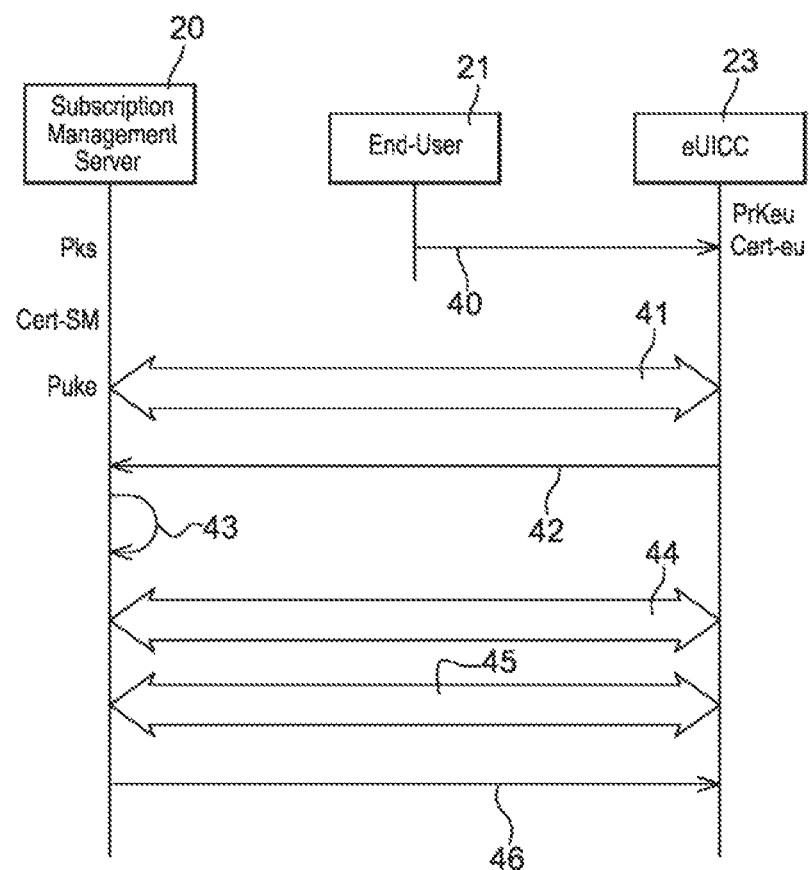
FIG. 3 is a timing diagram illustrating steps of a method of remote subscription management according to a second embodiment of the invention.

In regard to FIG. 3, the invention also concerns a terminal 24 comprising a eUICC 23, the eUICC 23 comprising a private key PrKeu and a public certificate Cert-eu, the public certificate Cert-eu also comprising an information allowing a subscription manager server 20, with no prior knowledge of the eUICC 23, to decide if it can agree to manage the eUICC 23, wherein the eUICC 23 comprises instructions that cause a computer to execute the following operations:

at the occurrence of an event, establishing a secure channel between the eUICC 23 and a subscription manager server 20 by using the public certificate Cert-eu and dedicated cryptographic services of the eUICC 23;

sending from the eUICC 23 to the subscription manager server 20 a subscription management request of the eUICC 23.

Finally, the invention concerns a non-transitory computer readable storage medium comprised in a terminal 24, the terminal 24 also comprising a eUICC 23 comprising a private key Prkeu and a public certificate Cert-eu, the public certificate Cert-eu also comprising an information allowing a subscription manager server 20, with no prior knowledge of the eUICC 23, to decide if it can agree to manage the eUICC 23, the non-transitory computer-readable medium comprising instructions that cause a computer to execute the following operations:

at the occurrence of an event, establishing a secure channel between the terminal 24 and the subscription manager server 20 by using the private key PrKeu and the public certificate Cert-eu;

sending from the terminal 24 to the subscription manager server 20 a subscription management request of the eUICC 23.

The non-transitory computer readable storage medium is preferably comprised in the eUICC 23.

The advantages brought by the present invention are that the subscription manager server 20 doesn't need an a priori knowledge of the individual eUICCs. He just needs to be provisioned with the EUMs public keys Puke in order to control which individual eUICC can be accepted in the system.

The present invention also applies to UICCs extractible from terminals but is merely interessant in case of embedded UICCs (eUICCs). The form factor is of low importance.

The invention claimed is:

1. A method for remote subscription management of a universal integrated circuit card (eUICC) cooperating with a terminal, said eUICC comprising a private key and a public certificate signed by a manufacturer of said eUICC, said public certificate comprising information allowing any Subscriber Manager server from any operator, said Subscriber Manager server having a list of public keys of eUICC manufacturers that are trustable, with no prior knowledge of said eUICC individually, to decide if said Subscriber Manager server can agree to manage said eUICC, said Subscriber Manager server being separate from a Subscriber Manager Secure Routing (SM-SR) server and not needing to use the SM-SR to install a subscription associated with a subscription management request in said eUICC, said method comprising:
a—At the occurrence of an event initiated at said terminal, sending, to the Subscriber Manager server, at least the public certificate of the eUICC signed by the manufacturer, one public key of the list of public keys of eUICC manufacturers used to check the public certificate signed by the manufacturer, and establishing a first secure channel between said terminal and said Subscriber Manager server by using said public certificate signed by the manufacturer of the eUICC and dedicated cryptographic services of said eUICC;

b—Sending from said terminal to said Subscriber Manager server a subscription management request, being considered as an enrolment request by said Subscriber Manager server;

c—Verifying, based on said information in the received public certificate signed by the manufacturer from said eUICC, in said Subscriber Manager server, if said eUICC is entitled to be managed by said Subscriber Manager server, wherein said information comprises an eUICC version identifier, and, responsive to verifying that said eUICC is entitled to be managed by said Subscriber Manager server:

d—Performing a key establishment procedure to at least generate keys for establishing a second secure channel between said Subscriber Manager server and said eUICC by using said public certificate signed by the manufacturer, wherein this step comprising the enrolment of the eUICC by the subscription;

e—Establishing between said Subscriber Manager server and said eUICC the second secure channel with the keys generated at step—d—; and f—Executing by said Subscriber Manager server said subscription management request on said eUICC.

2. The method according to claim 1, wherein said terminal comprises an application, said application performing steps—a—and—b—by:

at the occurrence of said event, establishing a local secure channel between said eUICC and said application by using said private key and said public certificate signed by the manufacturer;

establishing a secure channel with said Subscriber Manager server by using said public certificate signed by the manufacturer and dedicated cryptographic services of said eUICC;

sending from said application to said Subscriber Manager server a subscription management request of said eUICC.

3. The method according to claim 1, wherein said eUICC performs the steps—a—and—b—.

4. The method according to claim 1, wherein said event is generated by a user of said terminal.

5. The method according to claim 1, wherein the method further comprises:
establishing a third secure channel with said Subscriber Manager server and an application hosted by said terminal by using said public certificate signed by the manufacturer of the eUICC and dedicated cryptographic services of said eUICC.

6. A terminal comprising a universal integrated circuit card (eUICC) and an application, said eUICC comprising a private key and a public certificate signed by a manufacturer of said eUICC, wherein said application comprises instructions that cause a computer to execute the following operations:
   a—At the occurrence of an event initiated at said terminal, establishing a local first secure channel between said eUICC and said application by using said private key and said public certificate signed by the manufacture of the eUICC, said public certificate comprising information allowing a Subscriber Manager server from any operator, said Subscriber Manager server having a list of public keys of eUICC manufacturers that are trustable, with no prior knowledge of said eUICC individually, to decide if said Subscriber Manager server can agree to manage said eUICC, wherein said Subscriber Manager server being separate from a Subscriber Manager Secure Routing (SM-SR) server and not needing to use the SM-SR to install a subscription associated with a subscription management request in said eUICC;
   b—Sending, to the Subscriber Manager server at least the public certificate of the eUICC signed by the manufacturer, one public key of the list of public keys of eUICC manufacturers being used to check the public certificate signed by the manufacturer, and establishing a second secure channel with said Subscriber Manager server and said application by using said public certificate signed by the manufacturer of the eUICC and dedicated cryptographic services of said eUICC; and
   c—Sending from said application to said Subscriber Manager server said subscription management request of said eUICC;
   wherein said Subscriber Manager server can:
   verify, based on said information in the received public certificate signed by the manufacturer from said eUICC, said information comprising an eUICC version identifier, if said eUICC is entitled to be managed by said Subscriber Manager server; and responsive to verifying that said eUICC is entitled to be managed by said Subscriber Manager server, execute said subscription management request on said eUICC.

7. The terminal according to claim 6, wherein the operations further comprise:
establishing a third secure channel between said Subscriber Manager server and said eUICC by using said public certificate signed by the manufacturer of the eUICC and dedicated cryptographic services of said eUICC.

8. A Subscriber Manager server from an operator configured for remote subscription management of a universal integrated circuit card (eUICC) cooperating with a terminal, said eUICC comprising a private key and a public certificate signed by a manufacturer of said eUICC, said public certificate comprising information allowing the Subscriber Manager server having a list of public keys of eUICC manufactures that are trustable, with no prior knowledge of said eUICC individually, to decide if said Subscriber Manager server can agree to manage said eUICC, said Subscriber Manager server being separate from a Subscriber Manager Secure Routing (SM-SR) server and not needing to use the SM-SR to install a subscription associated with a subscription management request in said eUICC,
   said Subscriber Manager server is configured to perform the steps comprising:
   a—receive, from the terminal at the occurrence of an event initiated at said terminal, at least the public certificate of the eUICC signed by the manufacturer, one public key of the list of public keys of eUICC manufacturers being used to check the public certificate signed by the manufacturer, and establishing a first secure channel between said terminal and said Subscriber Manager server by using said public certificate signed by the manufacturer of the eUICC and dedicated cryptographic services of said eUICC;
   b—receive from said terminal said subscription management request, and to consider said subscription management request as an enrolment request;
   c—verify, based on said information in the received public certificate from said eUICC signed by the manufacturer, in said Subscriber Manager server, if said eUICC is entitled to be managed by said Subscriber Manager server, wherein said information comprises an eUICC version identifier, and responsive to verifying that said eUICC is entitled to be managed by said Subscriber Manager server:
   d—perform a key establishment procedure to at least generate keys for establishing a second secure channel between said Subscriber Manager server and said eUICC by using said public certificate signed by the manufacturer, wherein this step comprising the enrolment of the eUICC by the subscription;
   e—establish between said Subscriber Manager server and said eUICC the second secure channel with the keys generated at step—d—; and
   f—execute by said Subscriber Manager server said subscription management request on said eUICC.

9. The Subscriber Manager server according to claim 8, wherein the steps further comprise:
establish between said Subscriber Manager server and an application hosted by said terminal a third secure channel.

* * * * *